US012610252B2

(12) United States Patent
Jalkanen et al.

(10) Patent No.: US 12,610,252 B2
(45) Date of Patent: Apr. 21, 2026

(54) MANAGEMENT OF AN UPDATE OF A CONFIGURATION OF A TERMINAL DEVICE

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 640 days.

(21) Appl. No.: 17/961,444

(22) Filed: Oct. 6, 2022

(65) Prior Publication Data

US 2023/0116222 A1 Apr. 13, 2023

(30) Foreign Application Priority Data

Oct. 8, 2021 (FI) ..................................... 20216046

(51) Int. Cl.
*H04W 24/02* (2009.01)
*H04W 64/00* (2009.01)

(52) U.S. Cl.
CPC ........... *H04W 24/02* (2013.01); *H04W 64/00* (2013.01)

(58) Field of Classification Search
CPC .... H04W 24/02; H04W 64/00; H04L 41/082; H04L 41/12; H04L 43/04; H04L 43/0852; H04L 43/0876
USPC ................................. 370/329, 338, 331, 328
See application file for complete search history.

(56) References Cited

U.S. PATENT DOCUMENTS

| | | | | | |
|---|---|---|---|---|---|
| 11,651,842 | B2 * | 5/2023 | Jung | ..................... | G06Q 50/22 |
| | | | | | 705/3 |
| 2004/0121769 | A1 * | 6/2004 | Aoki | ..................... | H04W 8/04 |
| | | | | | 455/435.1 |

| | | | | | |
|---|---|---|---|---|---|
| 2005/0120865 | A1 * | 6/2005 | Tada | ..................... | G10H 1/0058 |
| | | | | | 84/600 |
| 2005/0227684 | A1 | 10/2005 | Niedermeier et al. | | |
| 2010/0159949 | A1 * | 6/2010 | Selgert | ............... | H04W 64/003 |
| | | | | | 455/456.1 |
| 2015/0087289 | A1 * | 3/2015 | Ahn | ..................... | H04W 4/50 |
| | | | | | 455/419 |

(Continued)

FOREIGN PATENT DOCUMENTS

| | | |
|---|---|---|
| EP | 1 358 772 B1 | 6/2010 |
| EP | 2 830 338 | 1/2015 |
| WO | 02/060204 A1 | 8/2002 |

OTHER PUBLICATIONS

Search Report issued in European Patent Application No. EP 22 19 9697 dated Jan. 20, 2023.

(Continued)

*Primary Examiner* — Joseph Arevalo

(74) *Attorney, Agent, or Firm* — NIXON & VANDERHYE

(57) ABSTRACT

Disclosed is a method for managing an update of a configuration of a terminal device accessible over a mobile communication network, the method, performed by an apparatus having access to data indicative of a behavior of the terminal device and to data indicative of a service of a mobile communication network with respect to the behavior of the terminal device, includes: detecting an instant to update the configuration of the terminal device; and generating, upon the detecting, a control signal to the terminal device to trigger the update of the configuration of the terminal device. Also disclosed is an apparatus, a system and a computer program.

15 Claims, 3 Drawing Sheets

(56) References Cited

U.S. PATENT DOCUMENTS

| 2017/0150325 | A1* | 5/2017 | Mills | H04W 12/08 |
| 2018/0144599 | A1* | 5/2018 | Chen | G08B 21/0476 |
| 2018/0322204 | A1* | 11/2018 | Dintenfass | G16H 40/20 |
| 2018/0324186 | A1* | 11/2018 | Dintenfass | G06F 21/31 |
| 2019/0121569 | A1* | 4/2019 | Sandholm | G06F 16/24568 |
| 2020/0404745 | A1* | 12/2020 | Costa | H04W 76/16 |
| 2020/0409388 | A1* | 12/2020 | Maeda | G08G 1/163 |
| 2021/0136529 | A1 | 5/2021 | Schneider et al. | |

OTHER PUBLICATIONS

Search Report for FI U.S. Appl. No. 20/216,046 dated May 11, 2022, 1 page.

\* cited by examiner

MANAGEMENT OF AN UPDATE OF A CONFIGURATION OF A TERMINAL DEVICE

CROSS-REFERENCE TO RELATED APPLICATIONS

This application claims priority to FI Patent Application No. 20216046 filed Oct. 8, 2021, the entire contents of which are hereby incorporated by reference.

TECHNICAL FIELD

The invention concerns in general the technical field of telecommunications. More particularly, the invention concerns a management of a terminal device.

BACKGROUND

Nowadays, wireless terminal devices may be updated over a wireless communication when needed. The update may refer to a change in the configuration of the terminal device and this may correspond to an update of an operating system or an application. The update comprising e.g. downloading of data and installing it may be time-consuming and the update may not be possible to perform at all instants of time e.g. due to a fact that the device is in use, or due to that the mobile communication network resources are not satisfactory for the update, or due to any other reason.

The existing solutions to perform the update are implemented so that the terminal device requests a permission for the update from the user of the device and in response to an allowance of the update the update of the configuration is performed to. In some scenarios the download of the data, or at least part of it, for the update may have occurred in the background of the main operation of the terminal device and the update is allowed by the user. In such scenarios the download of data for the update may consume the communication resources from the main operation as well as be executed at such instant of time, or a location, which is not optimal from a variety points of view. For example, if the terminal device is on move and the network resources used for the communication are limited, the download of data package for the update may take long time, which makes the download prone to errors, and, hence, eventually prevents the update.

In view of above there is a possibility to introduce more sophisticated approaches for the update of a configuration of terminal devices which improve prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, an apparatus, a system, and a computer program for managing an update of a configuration of a terminal device.

The objects of the invention are reached by a method, an apparatus, a system, and a computer program product as defined by the respective independent claims.

According to a first aspect, a method for managing an update of a configuration of a terminal device accessible over a mobile communication network is provided, the method, performed by an apparatus having access to data indicative of a behavior of the terminal device and to data indicative of a service of a mobile communication network with respect to the behavior of the terminal device, comprises:

detecting, based on the data indicative of the behavior of the terminal device and the data indicative of the service of the mobile communication network with respect to the behavior of the terminal device, an instant to update the configuration of the terminal device;

generating, upon the detecting, a control signal to the terminal device to trigger the update of the configuration of the terminal device.

The detecting may be performed based on at least one of the following: time, a location of the terminal device.

The method may further comprise, prior to the triggering the update of the configuration of the terminal device:

determining a location of the terminal device at the instant to update the configuration of the terminal device;

detecting if the determined location of the terminal device corresponds to a reference location of the terminal device at the instant, the reference location derivable from the data indicative of the behavior of the terminal device;

generating, upon a detection that the determined location of the terminal device deviates from the reference location of the terminal device, a cancellation to trigger the update of the configuration of the terminal device.

The control signal may comprise at least part of data to update the configuration of the terminal device.

Alternatively or in addition, the control signal may comprise data configured to cause the terminal device to initiate a download of data to update the configuration of the terminal device. The data may also comprise a network address of a network node configured to store the data to update the terminal device.

The data indicative of the behavior of the terminal device may comprise at least one of the following: direction of a motion of the terminal device determined based on a change of location of the terminal device; velocity of a motion of the terminal device determined based on a change of location of the terminal device with respect to a time; the mobile communication network serving the terminal device in the location of the terminal device; used application or service in the location of the terminal device; a requirement for bandwidth by the terminal device; requirement for latency of the terminal device; a state of the terminal device; a capability of the terminal device.

Further, the data indicative of the service of the mobile communication network may comprise at least one of the following: a capability of the mobile communication network in a location of the terminal device or in its known route; load of the mobile communication network in a location of the terminal device or in its known route; a capability of a core network of the mobile communication network serving the terminal device; load of a core network of the mobile communication network serving the terminal device; malfunction of the mobile communication network in a location of the terminal device or in its known route; planned service break in a location of the terminal device or in its route.

According to a second aspect, an apparatus for managing an update of a configuration of a terminal device accessible over a mobile communication network is provided, the apparatus having access to data indicative of a behavior of the terminal device and to data indicative of a service of a mobile communication network with respect to the behavior of the terminal device is configured to:

detect, based on the data indicative of the behavior of the terminal device and the data indicative of the service of the mobile communication network with respect to the behavior of the terminal device, an instant to update the configuration of the terminal device;

generate, upon the detecting, a control signal to the terminal device to trigger the update of the configuration of the terminal device.

The apparatus may be configured to perform the detecting based on at least one of the following: time, a location of the terminal device.

The apparatus may be, prior to the triggering the update of the configuration of the terminal device, further configured to:

determine a location of the terminal device at the instant to update the configuration of the terminal device;

detect if the determined location of the terminal device corresponds to a reference location of the terminal device at the instant, the reference location derivable from the data indicative of the behavior of the terminal device;

generate, upon a detection that the determined location of the terminal device deviates from the reference location of the terminal device, a cancellation to trigger the update of the configuration of the terminal device.

The apparatus may also be configured to generate the control signal comprising at least part of data to update the configuration of the terminal device.

Alternatively or in addition, the apparatus may be configured to generate the control signal comprising data causing the terminal device to initiate a download of data to update the configuration of the terminal device. For example, the apparatus may be configured to include a network address of a network node configured to store the data to update the terminal device to the data of the control signal.

According to a third aspect, a system is provided, the system comprising:

a terminal device;

at least one mobile communication network arranged to provide a communication service to the terminal device; and an apparatus according to the second aspect as defined above.

According to a fourth aspect, a computer program is provided, the computer program comprising instructions which, when the program is executed by a computer, cause the computer to carry out the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
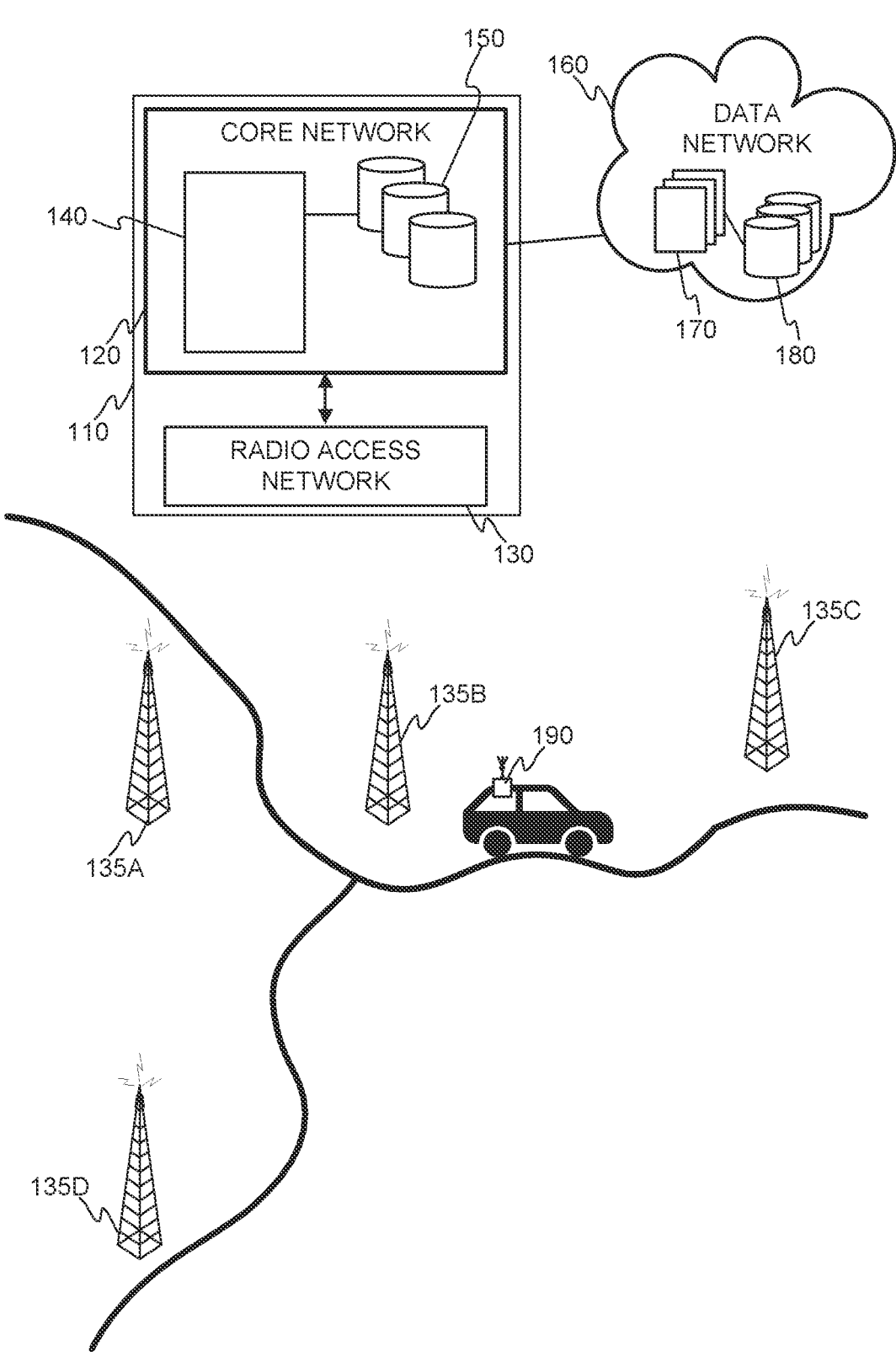
FIG. 1 illustrates schematically a communication environment according to an example.

FIG. 1 illustrates schematically an example of a communication environment into which the present invention may be implemented to. The communication environment comprises a mobile communication system consisting of a mobile communication network 110 and one or more terminal devices 190 connected to the mobile communication network 110 by applying a wireless communication service provided by the mobile communication network 110. The mobile communication network 110 may consist of a core network 120 and a radio access network 130 as is commonly known. For example, the core network 120 may comprise network management functions implemented with one or more network devices referred with the reference 140 in FIG. 1 as well as a number of registers referred with the reference 150 in FIG. 1 which may e.g. store subscriber related data and/or data indicative of an operation of the mobile communication network 110 and its characteristics over the coverage area. The radio access network 130, in turn, may comprise base stations 135A, 135B, 135C, 135D and a number of controllers for the base stations 135A-135D wherein the entities of the radio access network 130 are configured to execute operations generating the wireless network coverage under control of the core network 120. For sake of clarity, it is worthwhile to mention that the base stations 135A-135D generate their own wireless network coverage and, hence, provide the communication service to the terminal devices 190 residing in the coverage area. Moreover, the communication environment may be implemented so that the mobile communication network 110 is communicatively connected to data network 160, such as to the Internet. The data network may comprise apparatuses 170, such as network devices like servers, and data storages 180, for example. The connection between the mobile communication network 110 and the data network 160 may be implemented in a known manner with applicable gateways and interworking units.

As said, the terminal devices 190 are configured to implement a communication technology corresponding to one, or ones, provided by the mobile communication network 110 in order to enable the wireless communication. For accessing the mobile communication network 110, the terminal device 190 may be equipped with a subscription implemented e.g. as a subscriber identity module (SIM) in a known manner. For the purpose of describing at least some aspects of the present invention the terminal devices 190 may store computer program product, e.g. in a form of an operating system or an application program, which are updateable over the wireless communication connection. For sake of clarity the term "terminal device" 190 shall be understood in a broad manner and so that it refers to any entity accessible through the wireless communication. The entity may e.g. be a user device, such as a mobile phone, a tablet computer, or a laptop, but it may also refer to a vehicle, such as an electric car or a boat or any other entity, which is arranged to execute a computer program and is provided with means for wireless communication, such as with a wireless modem.

In accordance with an example embodiment of the invention a collection of data indicative of the terminal device 190, and especially its behavior with respect to the mobile communication network 110, is arranged. Additionally, a collection of data indicative of a service of the mobile communication network 110 is arranged. The collection of the data indicative of the service of the mobile communication network 110 may advantageously be performed with respect to the statistical behavior of the terminal device 190 as is described in the forthcoming description. The collection of the sets of data may be arranged to at least one data storage 150, 180 residing e.g. in the mobile communication network 110 or in the data network 160. It shall be understood that the data storage in question is not necessarily a separate entity but may be integrated to a network element configured to perform an analysis of data as is described in the following. Moreover, the data indicative of the of the terminal device 190 and the data indicative of the service of the mobile communication network 110 may be stored to the same data storage 150, 180 or to separate data storages 150, 180.

Figure 2:
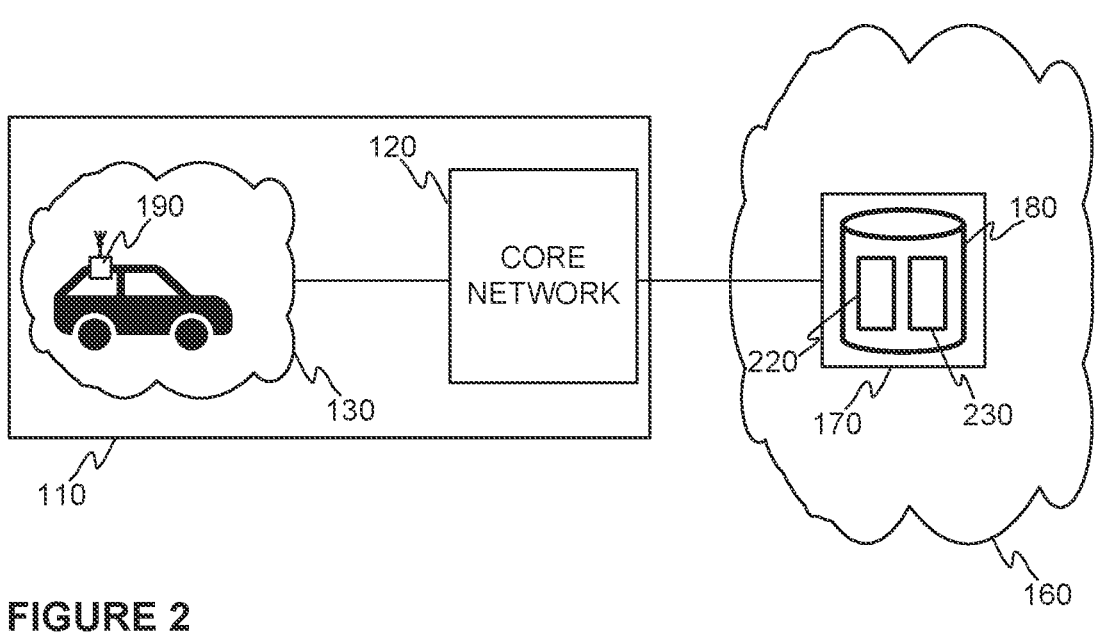
FIG. 2 illustrates schematically an implementation of the invention according to an example.

For describing further aspects of the present invention an example embodiment schematically illustrated in FIG. 2 is referred to. In the embodiment of FIG. 2 an apparatus 170 is arranged to the data network 160 and the apparatus 170 comprises an integrated data storage 170, such as a memory maintaining a database, which is configured to store data 220 indicative of a behavior of the terminal device 190 and data 230 indicative of a service of the mobile communication network 110. As already mentioned, the apparatus 220, and the respective data storage, or storages, may reside in the mobile communication network 110. In the solution as schematically illustrated in FIG. 2 a management of the apparatus 170, and related entities, such as the data storage 180, may be performed by an external party to a telecom operator of the mobile communication network 110 if the sets of data 220, 230 are provided to the external party in a required extent from the mobile communication network 110 by the telecom operator and from the user of the terminal device 190 if a permission is required e.g. due to juridical reasons. The apparatus 170 may refer to a stand-alone single device, such as to a server device, or it may be implemented as a distributed computing environment with a plurality of apparatuses configured to cooperate in a manner resulting an operation as described.

The data indicative of the behavior of the terminal device 190 may comprise data descriptive of a number of aspects. In accordance with an example embodiment the data may comprise location data of the terminal device 190 over a predefined time window. The predefined time window may correspond to a lifetime of the terminal device 190 or to any shorter time window, such as to a month, a week, a day, or anything similar. In other words, location data is collected and stored with respect to the time e.g. to perform statistical analysis to the location data to detect repetitive patterns, if any, in the behavior of the terminal device 190 e.g. with respect to the time. As a non-limiting example, the data is such that it may be detected that the terminal device 190 travels the same route at the same time every weekday, but not during the weekends. Alternatively or in addition, it may be detected from the data that the terminal device 190 resides in the same location over nights, or at any other time of a day/week/month and so on. In addition to the locational data the data indicative of the behavior of the terminal device 190 may comprise data descriptive of other aspects. In some example embodiments, the data may comprise information on applications executed by the terminal device 190 as well as computing resources required by the applications from the terminal device 190. Such data may also be expressed in relation to time and/or location. For example, it may be derived that the user of the terminal device 190 statistically uses a certain application when traveling from a first location to a second location at a certain instant of time. This may correspond to a detection that the user usually makes a phone call when driving a car from work to home. Moreover, the data indicative of the behavior of the mobile terminal may comprise detections if the terminal device 190 statistically hops between different radio technologies in certain locations. In some application areas the data indicative of the behavior of the terminal device 190 may relate to a monitoring of a velocity of the terminal device 190 e.g. with respect to locational data to detect when the terminal moves at a velocity suitable for transferring data in a desired manner. For example, if the terminal device 190 is associated to a vehicle, the velocity related aspects may become relevant to understand.

In the following it is listed at least some parameters indicative of the behavior of the terminal device 190 either alone or in combination with at least one other. At least some of these non-limiting examples are already discussed in the foregoing description.

Location and direction of motion of the terminal device 190 wherein the location may be determined with a positioning service of the terminal device or the network and wherein the direction of the motion may be determined based on a change of location of the terminal device 190

Velocity of the motion of the terminal device 190 e.g. determined based on a change of location of the terminal device 190

The mobile communication network serving the terminal device 190

Used application/service

Requirement for bandwidth (upstream and downstream)

Requirement for latency

State of the terminal device, e.g. idle or active

Capability of the terminal device

The data indicative of the service of the mobile communication network 110, in turn, may refer to any information descriptive of an operation of the mobile communication network 110 serving the terminal device 190. As non-limiting examples of aspects stored in the data may be mentioned the communication technologies available e.g. with respect location, any maintenance work performed or planned to be performed to the mobile communication network 110 with time schedule as well as data descriptive of effects of the maintenance work to the mobile communication network 110 and its service capability. Further, the data indicative of the service of the mobile communication network 110 may comprise data descriptive of the load of the mobile communication network 110 and e.g. an estimation of an effect of the load to the operation of the mobile communication network 110. Such information may e.g. be derived with respect to a location e.g. in an accuracy of cells, or base stations, but also by taking into account the time as a parameter. For example, the information descriptive of the operation of the mobile communication network 110 may e.g. define that the network at a certain location is congested every weekday in a certain time window.

In the following it is listed at least some parameters indicative of the service of the mobile communication network 110 which may be used either alone or in combination with at least one other. At least some of these non-limiting examples are already discussed in the foregoing description.

Capability of the mobile communication network 110 in a location of the terminal device 190, or in its known route Load of the mobile communication network 110 in a location of the terminal device, or in its known route Capability of a core network of the mobile communication network 110 serving the terminal device 190

Load of a core network of the mobile communication network 110 serving the terminal device 190

Malfunction of the mobile communication network 110 in a location of the terminal device 190, or in its known route Planned service break in a location of the terminal device 190, or in its route In the described manner it may be generated data records 220, 230 containing data indicative of the behavior of the terminal device 190 and data indicative of the service of the mobile communication network 110 accessible for the apparatus 170. The data records may be considered to represent so-called digital twin of the respective entities since they are representations of the entities and their operations.

It is now assumed that a configuration of the terminal device 190 requires update, such as an update of the operating system. It is also assumed, for a sake of clarity, that the entity detecting the update of configuration is the apparatus 170. In other words, the apparatus 170 may be configured to manage at least in part the update of the configuration. For example, the apparatus 170 may be a server device configured to receive software updates of the terminal device 190 and manage the update process in a manner as described herein. The software updates may e.g. be received from a manufacturer of the terminal device 190, such as from the car manufacturer, wherein the apparatus 170 is configured to manage the update process. The apparatus 170 may then be configured to determine at least one terminal device 190 requiring the update of the configuration in accordance with the software update and access the data stored in the data records 220, 230 for detecting an instant to perform the update. The detection of the instant may be performed based on the data indicative of the statistical behavior of the terminal device 190 and the data indicative of the service of the mobile communication network 110 with respect to the statistical behavior of the terminal device 190. More specifically, the detection of the optimal instant for the update may be based on detecting that one or more predefined criteria is fulfilled with respect to the mentioned sets of data. For example, with respect to the behavior of the terminal device a criterion may be that it resides in a certain location in order to allow the update. Another criterion may be, from the service of the mobile communication network 110 side, that the network is capable of providing network service with a certain technology, such as with the 5G technology, in the location of the terminal device 190 the update is allowed to. In response to finding such an instant that the one or more criteria are fulfilled to, the apparatus 170 is configured to generate a control signal to the terminal device 190 to trigger the update of the configuration of the terminal device 190 as described. For example, the generation of the control signal may be implemented so that the control signal comprises data causing, by interpreting at least part of the data in the terminal device 190, an initiation of the update of the configuration. For example, the terminal device 190 may be arranged to execute, e.g. in a background, an application managing any updates of software at the terminal device 190 end, and in response to the receipt of the control signal, the application initiates the update procedure. For example, the update procedure may comprise a download of a data package comprising the software update and an installation of it. According to another embodiment the apparatus 170 may be arranged to generate the control signal so that at least part of data for the update is included in the control signal and delivered to the terminal device 190 along the control signal. As a non-limiting example, the data included in the control signal may e.g. be data of an update manager which, by executing it in the terminal device 190, starts managing the update procedure in the terminal device 190. In some example embodiments the control signal may comprise the whole data package for the update as a whole. Alternatively or in addition, the control signal may comprise data defining at least some aspects of the update, such as parameters relating to the data package, instant of time for the download or the installation, a network address defining a network node, such as a server device, to which the terminal device 190 shall connect for the update, or any other parameters.

Figure 3:
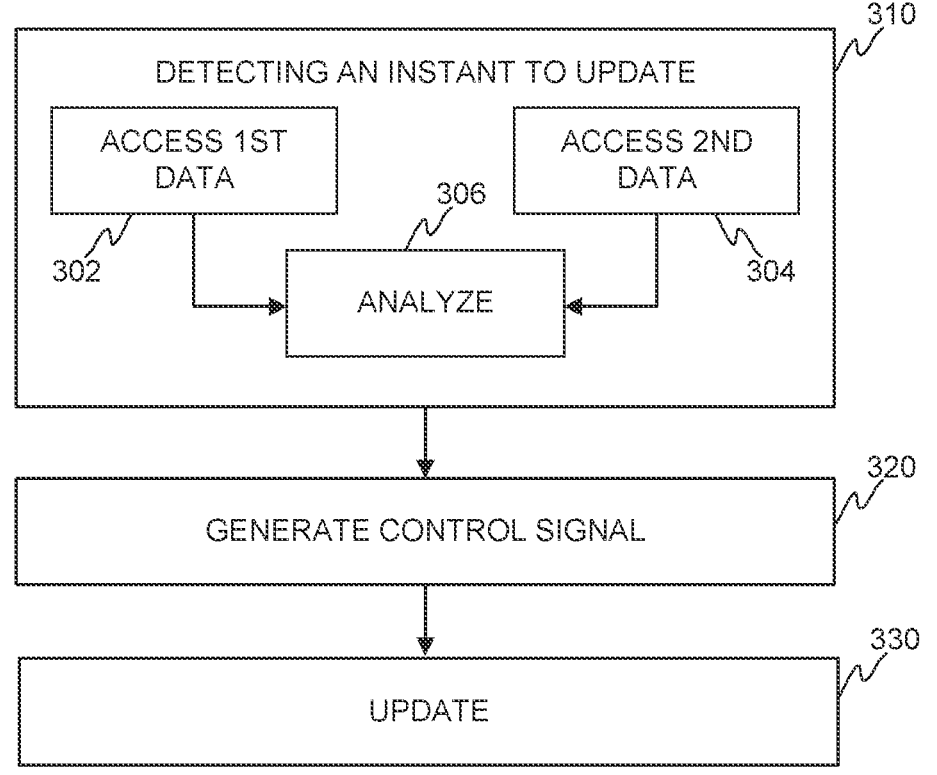
FIG. 3 illustrates schematically a method according to an example.

FIG. 3 illustrates schematically an example of a method according to the invention. For implementing the method data indicative of a behavior of the terminal device and to data indicative of a service of a mobile communication network are collected and stored from different entities. For example, the data indicative of the behavior of the terminal device 190 may be established by monitoring the terminal device 190 in a various manner. For example, by gathering location data over a predefined time window may be performed. Alternatively or in addition, an operation of the terminal device 190 may be monitored with an applicable application executed in the terminal device 190 and the gathered data may be delivered to the apparatus 170, or to a predefined data storage 150, 180 in accordance with the implementation of the invention. Correspondingly, data indicative of the service of the mobile communication network 110 may be collected in the manner as described in the foregoing description. The apparatus 170 arranged to perform at least part of the method for managing the update of the configuration of the terminal device 190 accessible over the mobile communication network 110 may be arranged to manipulate the collected data e.g. by classifying the data in each category in a predefined manner. For example, it may be arranged to classify locations of the terminal device 190 with respect to any parameter representing time. Correspondingly, it may be arranged to classify data indicative of the service of the mobile communication network 110 e.g. in a manner that a representation of the quality of service is generated with respect to a location and time. Based on the data accessible by the apparatus 170 it is first configured to detect 310 an instant to perform and in accordance with the detection 310 to generate 320 a control signal to trigger an update which causes the update 330 of the configuration of the terminal device 190 at the detected instant. The detection 310 of the optimal instant for performing the update is performed by accessing a first data 302 corresponding to the data indicative of the behavior of the terminal device 190, or any manipulated data generated from the first data, and by accessing to a second data 340 corresponding to the data indicative of the service of the mobile communication network 110, or any manipulated data generated from the second data. For sake of clarity, the manipulated data may refer to any data derived from the original data e.g. by applying statistical analysis to the original data. In some embodiments the manipulation of the respective sets of data may be performed in steps 302 and 304 in a predefined manner e.g. by having a goal to make them commensurable. Next, in step 306 of FIG. 3 the apparatus 170 is configured to perform an analysis to the data brought to the analysis phase 306 wherein a mapping is performed between the two sets of data, i.e. to original data or any derivation of the original data. In the mapping the aim is to find a match in order to set an instant of time to perform the update of the configuration. For example, according to an embodiment the apparatus may first determine one or more locations of the terminal device 170 where the mobile communication network 110 is able to provide a service meeting certain criterion or criteria, such as providing a communication technology most suitable for meeting the requirement of the update, such as a bandwidth requirement as the requirement. Upon finding e.g. the location, or locations, the apparatus 170 may be configured to perform statistical analysis to the data indicative of the behavior of the terminal device 170 in order to determine when the terminal device 170 has resided in the determined location, or locations, based on the history data. In other words, the statistical analysis may be performed to find repetitive patterns in time scale when the terminal device 170 has resided in the defined locations. For example, it may be determined that the terminal device 170 resides, with a probability exceeding a predefined reference probability, in the defined location at a certain time, e.g. such as every Monday between 8 AM to 11 PM. As a result, the apparatus 170 may generate a control signal to the terminal device 190 to trigger the update at the defined instant of time. In some embodiments the control signal comprises data defining, and, thus, instructing, the terminal device 170 to trigger the update at the defined instant of time. Alternatively or in addition, the apparatus may generate 320 the control signal at the defined instant of time and deliver it then to the terminal device 170. The above-described example is advantageous because it takes into account key parameters to execute the update in an efficient manner.

In some further example embodiments, it may be arranged that it is checked, prior to trigger the update, that the circumstances correspond to one based on which the decision on the instant to trigger the update was made. For example, the apparatus 170 may be configured to generate an inquiry of the location of the terminal device 190 at the instant, or prior to the instant, to determine if the terminal device 190 locates in a candidate location derived from the data indicative of the behavior of the terminal device 190 in which the update is decided to be performed. The inquiry may be made to the terminal device 190 itself, or to any other entity maintaining up-to-date information on the location of the terminal device 190. In response to a confirmation that the terminal device 190 resides in the determined candidate location, the update process may be continued as planned. On the other hand, if the response to the inquiry indicates a location deviating from the determined candidate location, the apparatus 170 may be configured to generate a cancellation signal to prevent the update. The cancellation signal may be internal in the apparatus 170 preventing the triggering of the update or if the terminal device 190 is instructed to trigger the update, the cancellation signal is generated to the terminal device 190.

Figure 4:
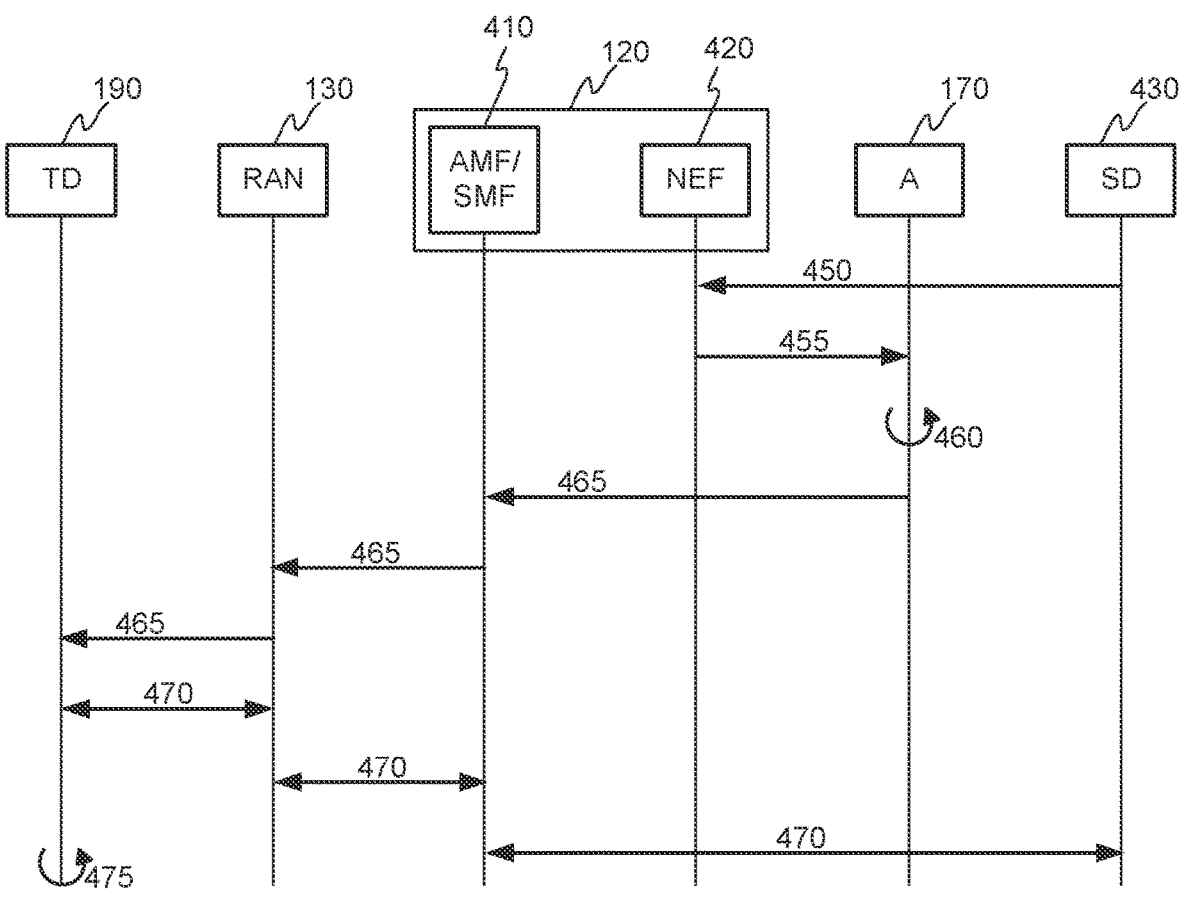
FIG. 4 illustrates schematically a further example as a flow chart.

To provide more insight to various aspects of the present invention it is hereby referred to FIG. 4 in which the present invention is applied in an environment where the terminal device 190 is a vehicle whose software is to update. The vehicle comprises necessary communication means to interact with the mobile communication network 110 for enabling an execution of the invention. For describing the invention, it is hereby assumed that the update requires, e.g. due to a definition provided by the vehicle manufacturer delivering the updates, certain technical communication environment for the update, which may e.g. be a network coverage with 5G communication technology implemented with a radiation of 26 GHz. In the example of FIG. 4, the vehicle manufacturer represented as a network node 430, such as a server device, in the data network 160 is arranged to generate an initiation signal 450 for performing a configuration update of the terminal device 190 to the mobile communication network 110. According to the example of FIG. 4 the initiation signal 450 is generated to the mobile communication network 110 and to the core network 120 therein. More specifically, since the mobile communication network 110 according to the example is implementing the 5G network technology, the initiation signal may be delivered to a Network Exposure Function (NEF) 420 which exposes services and resources over Application Program Interfaces (API) internally and externally to the core network 120. The NEF 420 may be configured to detect that the initiation signal 450 requests the update and the detection may be performed based on data carried in the signal, or any other commonly known characteristic of the signal which may be used in the detection. The NEF 420 may be configured to indicate the requirement to update to an apparatus 170 configured to manage, at least in part, the update process as referred with a signal 455 in FIG. 4. In response to a receipt of the signal 455 the apparatus 170 may be configured to perform one or more internal operations 460, which may e.g. comprise a detection of terminal devices 190 of the vehicle manufacturer requiring the update. Furthermore, it may be configured to initiate a detection of an instant of update for at least one terminal device 190. The detection may be performed in the manner as described in the foregoing description i.e. by applying the data indicative of the behavior of the terminal device 190 and the data indicative of the service of the mobile communication network 110, the sets of data being arranged accessible to the apparatus 170.

Next, in accordance with the example of FIG. 4 the apparatus 170 may be configured to monitor the instant of time being optimal for the update of the configuration of the at least one terminal device 190 and once the instant of time is reached, the apparatus 170 is configured to generate a control signal to trigger the update. The control signal 465 is first generated to a core network 120 reaching entities 410 called as an Access and Mobility Management Function (AMF) and Session Management Function (SMF) wherein the AMF handles connection and mobility management tasks in the communication whereas the SMF manages the session itself. The control signal 465 is then delivered to the terminal device 190 over the radio access network 130. In accordance with the example embodiment shown in FIG. 4 the control signal 465 may carry data causing an initiation of the update procedure. The control signal 465 may e.g. comprise instruction to the terminal device 190 with respect to the update, such as providing a network address from where the data package for the updating may be received. Alternatively, the terminal device 190 may possess the network address as a preprogrammed piece of data and the control signal triggers the terminal device 190 to initiate the update procedure. In the example as shown in FIG. 4 the terminal device 190 is arranged to establish a connection 470 to the network node 430 of the vehicle manufacturer first over a wireless connection of the mobile communication network 110 meeting the requirement set for the upload, such as the 5G technology at 26 GHz, and then to the data network over through the core network 120 of the mobile communication network 110. The terminal device 190 may perform the update 475 through the established connection 470 by interacting with the network node 430. The interaction may comprise, but is not limited to, e.g. download of data, but a management of the installation of the update by the network node 430, for instance.

In the embodiment of FIG. 4 it is shown that the update is performed between the terminal device 190 and the network node 430. However, the invention is not only limited to such an implementation and it may e.g. be arranged that the apparatus 170 receives and maintains the software packages for the update from the network node 430 and the applicable communication connection 470 for the update is established between the terminal device 190 and the apparatus 170.

Figure 5:
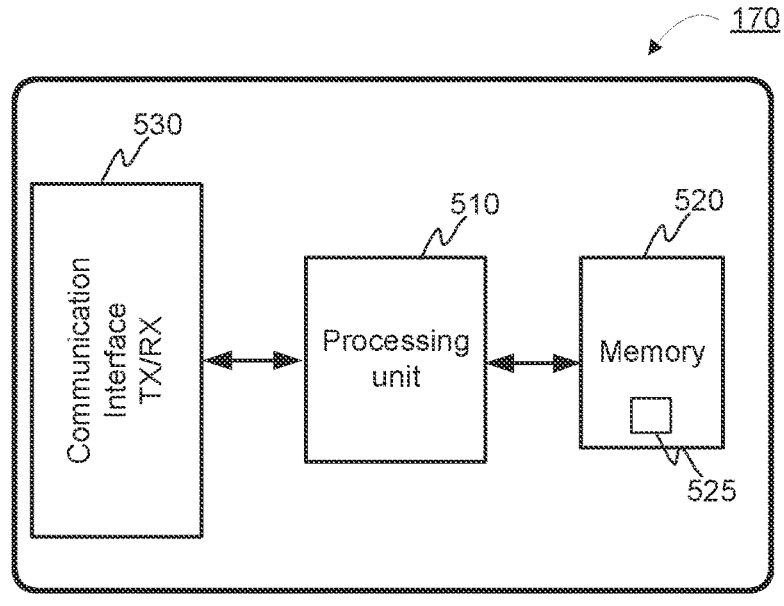
FIG. 5 illustrates schematically an apparatus according to an example.

For sake of completeness an example of a device suitable for performing a task of the apparatus 170 according to an example embodiment the invention is schematically illustrated in FIG. 5 as a block diagram. The apparatus 170 may be configured to implement at least part of the method for managing an update of a configuration of a terminal device 190 accessible over a mobile communication network 110 as described. The execution of the method, or at least some portions of it, may be achieved by arranging at least one processor 510 to execute at least some portion of computer program code 525 stored in at least one memory 520 causing the processor 510, and, thus, the apparatus 170 to implement the method steps as described. In other words, the processor 510 may be arranged to access the memory 520 and to retrieve and to store any information therefrom and thereto. Moreover, the processor 510 may be configured to control a communication through one or more communication interfaces 530 for accessing the other entities being involved in the operation. Hence, the communication interface 530 may be arranged to implement, possibly under control of the processor 510, corresponding communication protocols, such as an IP or any other communication protocol, for communicating with one or more entities. The term communication interface 530 shall be understood in a broad manner comprising necessary hardware and software elements for implementing the communication techniques. Further, the apparatus 170 in question may comprise one or more input/output devices for inputting and outputting information. Such input/output devices may e.g. be keyboard, buttons, touch screen, display, loudspeaker, microphone camera and so on. In some implementation of the apparatus 170 at least some of the input/output devices may be external to the apparatus 170 and coupled to it either wirelessly or in a wired manner. For sake of clarity, the processor 510 herein refers to any unit or a plurality of units suitable for processing information and control the operation of the apparatus 170 in general at least in part, among other tasks. The mentioned operations may e.g. be implemented with a microcontroller solution with embedded software. Similarly, the invention is not limited to a certain type of memory 520, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

In some examples, the apparatus 170 is implemented with a distributed computing environment in which a plurality of computing devices is configured to cooperate to cause an execution of the method according to at least one of the examples as described.

As derivable from above, some aspects of the present invention may relate to a computer program product which, when executed by at least one processor, cause an apparatus 170 to perform at least some portions of the method as described. For example, the computer program product may comprise at least one computer-readable non-transitory medium having the computer program code 525 stored thereon. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 525 may comprise a proprietary application, such as computer program code for executing the management of the communication connection in the manner as described.

In view of the teaching given herein a functionality of the apparatus 170 configured to perform a method in accordance with the present invention may be integrated to an applicable entity residing in a core network of a mobile communication network 110. A non-limiting example of the entity suitable for being configured to perform at least part of the method may be so-called Access and Mobility Management Function, AMF, of 5G mobile communication network. This is because the AMF is responsible for managing an access to the network, but also for managing subscribers in the network together with other entities, such as with the data storages 150 possible called as registers. According to another implementation, the apparatus 170 may be a dedicated device configured to perform a management of the update procedure in accordance with the present method as described. For example, it may be arranged to cooperate with the AMF to enable a delivery of the control signal through the AMF as shown. In such an implementation the apparatus 170 may reside in the core network or external to that, or even to the mobile communication network 110, as long as it is communicatively reachable from the core network, for instance.

An advantage of the present invention among other advantages is that it takes into account both the behavior of the terminal device 190 but also the operation of the mobile communication network 110 in scheduling the update of the configuration of the terminal device 190. The approach provides at least in part statistically an optimal instant of time for the update where, in some more sophistical approaches, the scheduled update may be cancelled, or postponed, if the circumstances do not meet the ones used for the scheduling.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for managing an update of a configuration of a terminal device accessible over a mobile communication network, the method, performed by an apparatus having access to data indicative of a behavior of the terminal device and to data indicative of a service of a mobile communication network with respect to the behavior of the terminal device, comprising:

detecting, based on the data indicative of the behavior of the terminal device and the data indicative of the service of the mobile communication network with respect to the behavior of the terminal device, an instant to update the configuration of the terminal device; and generating, upon the detecting, a control signal to the terminal device to trigger the update of the configuration of the terminal device, wherein the data indicative of the service of the mobile communication network comprises at least one of the following: a capability of the mobile communication network in a location of the terminal device or in its known route, a load of the mobile communication network in a location of the terminal device or in its known route, a capability of a core network of the mobile communication network serving the terminal device, a load of a core network of the mobile communication network serving the terminal device, a malfunction of the mobile communication network in a location of the terminal device or in its known route, and a planned service break in a location of the terminal device or in its route.

2. The method of claim 1, wherein the detecting is performed based on at least one of the following: time, and a location of the terminal device.

3. The method of claim 1, further comprising, prior to triggering the update of the configuration of the terminal device:

determining a location of the terminal device at the instant to update the configuration of the terminal device;

detecting whether or not the determined location of the terminal device corresponds to a reference location of the terminal device at the instant, the reference location derivable from the data indicative of the behavior of the terminal device; and generating, upon a detection that the determined location of the terminal device deviates from the reference location of the terminal device, a cancellation to trigger the update of the configuration of the terminal device.

4. The method of claim 1, wherein the control signal comprises at least part of data to update the configuration of the terminal device.

5. The method of claim 1, wherein the control signal comprises data configured to cause the terminal device to initiate a download of data to update the configuration of the terminal device.

6. The method of claim 5, wherein the data comprises a network address of a network node configured to store the data to update the terminal device.

7. The method of claim 1, wherein the data indicative of the behavior of the terminal device comprises at least one of the following: a direction of a motion of the terminal device determined based on a change of location of the terminal device, a velocity of a motion of the terminal device determined based on a change of location of the terminal device with respect to a time, the mobile communication network serving the terminal device in the location of the terminal device, a used application or service in the location of the terminal device, a requirement for bandwidth by the terminal device; requirement for latency of the terminal device, a state of the terminal device, and a capability of the terminal device.

8. An apparatus for managing an update of a configuration of a terminal device accessible over a mobile communication network, the apparatus having access to data indicative of a behavior of the terminal device and to data indicative of a service of a mobile communication network with respect to the behavior of the terminal device is configured to:

detect, based on the data indicative of the behavior of the terminal device and the data indicative of the service of the mobile communication network with respect to the behavior of the terminal device, an instant to update the configuration of the terminal device; and generate, upon the detecting, a control signal to the terminal device to trigger the update of the configuration of the terminal device, wherein the data indicative of the service of the mobile communication network comprises at least one of the following: a capability of the mobile communication network in a location of the terminal device or in its known route, a load of the mobile communication network in a location of the terminal device or in its known route, a capability of a core network of the mobile communication network serving the terminal device, a load of a core network of the mobile communication network serving the terminal device, a malfunction of the mobile communication network in a location of the terminal device or in its known route, and a planned service break in a location of the terminal device or in its route.

9. The apparatus of claim 8, wherein the apparatus is configured to perform the detecting based on at least one of the following: a time, and a location of the terminal device.

10. The apparatus of claim 8, wherein the apparatus, prior to the triggering the update of the configuration of the terminal device, is further configured to:

determine a location of the terminal device at the instant to update the configuration of the terminal device, detect whether or not the determined location of the terminal device corresponds to a reference location of the terminal device at the instant, the reference location derivable from the data indicative of the behavior of the terminal device, and generate, upon a detection that the determined location of the terminal device deviates from the reference location of the terminal device, a cancellation to trigger the update of the configuration of the terminal device.

11. The apparatus of claim 8, wherein the apparatus is configured to generate the control signal comprising at least part of data to update the configuration of the terminal device.

12. The apparatus of claim 8, wherein the apparatus is configured to generate the control signal comprising data causing the terminal device to initiate a download of data to update the configuration of the terminal device.

13. The apparatus of claim 12, wherein the apparatus is configured to include a network address of a network node configured to store the data to update the terminal device to the data of the control signal.

14. A system comprising:
a terminal device;

at least one mobile communication network configured to provide a communication service to the terminal device; and an apparatus configured to manage an update of a configuration of the terminal device accessible over the at least one mobile communication network, the apparatus having access to data indicative of a behavior of the terminal device and to data indicative of a service of a mobile communication network with respect to the behavior of the terminal device is configured to:

detect, based on the data indicative of the behavior of the terminal device and the data indicative of the service of the mobile communication network with respect to the behavior of the terminal device, an instant to update the configuration of the terminal device, and generate, upon the detecting, a control signal to the terminal device to trigger the update of the configuration of the terminal device, wherein the data indicative of the service of the mobile communication network comprises at least one of the following: a capability of the mobile communication network in a location of the terminal device or in its known route, a load of the mobile communication network in a location of the terminal device or in its known route, a capability of a core network of the mobile communication network serving the terminal device, a load of a core network of the mobile communication network serving the terminal device, a malfunction of the mobile communication network in a location of the terminal device or in its known route, and a planned service break in a location of the terminal device or in its route.

15. A computer program comprising at least one non-transitory computer-readable storage medium having computer-executable program code instructions stored therein, the program code instructions being configured, when the computer program is executed on a computer, to cause the computer to at least:

detect, based on the data indicative of the behavior of the terminal device and the data indicative of the service of the mobile communication network with respect to the behavior of the terminal device, an instant to update the configuration of the terminal device; and generate, upon the detecting, a control signal to the terminal device to trigger the update of the configuration of the terminal device, wherein the data indicative of the service of the mobile communication network comprises at least one of the following: a capability of the mobile communication network in a location of the terminal device or in its known route, a load of the mobile communication network in a location of the terminal device or in its known route, a capability of a core network of the mobile communication network serving the terminal device, a load of a core network of the mobile communication network serving the terminal device, a malfunction of the mobile communication network in a location of the terminal device or in its known route, and a planned service break in a location of the terminal device or in its route.

* * * * *